No. 843,089. PATENTED FEB. 5, 1907.
J. C. MOORE.
EYEGLASSES.
APPLICATION FILED SEPT. 14, 1906.
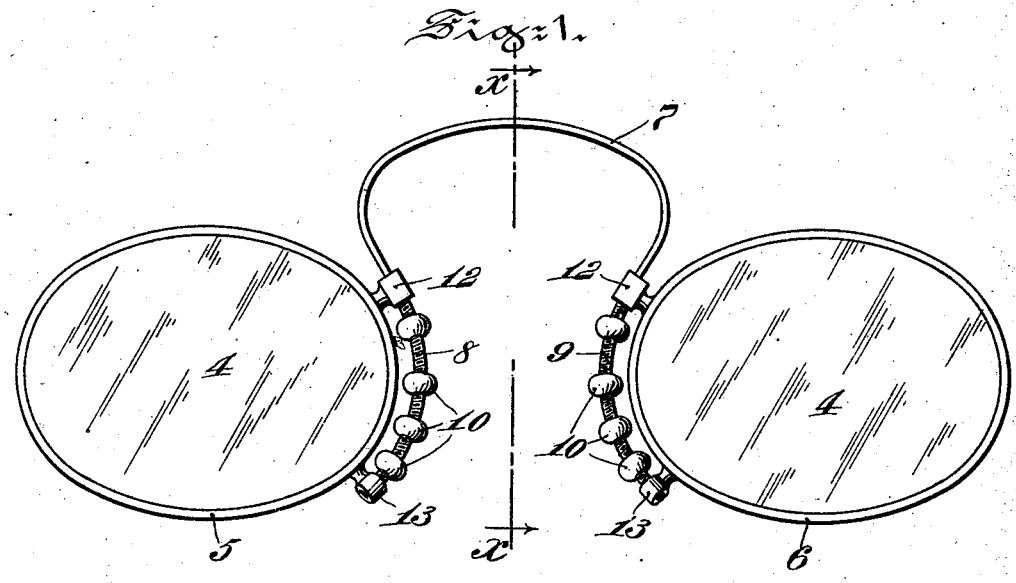
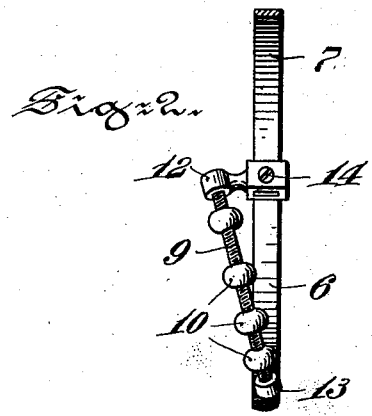
WITNESSES:
Thomas M. Smith
G. Chisholm
INVENTOR
James C. Moore,
BY
J. Walter Douglas,
ATTORNEY.

UNITED STATES PATENT OFFICE.

JAMES C. MOORE, OF PHILADELPHIA, PENNSYLVANIA.

EYEGLASSES.

No. 843,089.  Specification of Letters Patent.  Patented Feb. 5, 1907.

Application filed September 14, 1906. Serial No. 334,579.

*To all whom it may concern:*

Be it known that I, JAMES C. MOORE, a citizen of the United States, residing at the city of Philadelphia, in the county of Philadelphia and State of Pennsylvania, have invented certain new and useful Improvements in Eyeglasses, of which the following is a specification.

My invention has relation to the nose-guards for eyeglasses, in which the bearing contacts with the nose in normal position of the glasses can be shifted to relieve direct pressure of the glasses against the nose, as well as being adapted to modify or change the location of the bearing-contacts with respect to different conformations of a nose.

The nature and particular characteristic features of my present invention will be more fully understood from the following description, taken in connection with the accompanying drawings, forming part hereof, in which—

Figure 1 is a front elevational view of a pair of eyeglasses embodying the particular constructively-arranged features of my said invention; and Fig. 2 is a vertical sectional view on the line $x\,x$ of Fig. 1.

Referring to the drawings, 4 is the eyepieces or lenses, respectively mounted in frames 5 and 6.

7 is the spring or bridge-piece for coupling the eyepieces or lens-frame with each other.

8 and 9 are respectively threaded stems for a series of beads or buttons 10, constituting the nose-guards or rests of my said invention, as to constructive arrangement thereof for use. The stems 8 and 9 are held in clamps 12 and 13, projecting from the respective frames 5 and 6, and with which the spring or bridge-piece 7 is fitted and held in required position by means of tightening-screws 14. The threaded stems 8 and 9 of the nose guards or rests, having the series of buttons or beads 10 mounted on the stems of the same, are adapted to be shifted in an upward or downward direction, so as to relieve direct pressure of the guards or rests against the nose guards or rests, having the series of buttons or beads 10 mounted on the stems of the same, are adapted to be shifted in an upward or downward direction, so as to relieve direct pressure of the guards or rests against the nose. The curvature of the bridge-piece or spring 7 is preferably arranged so as to normally tend to maintain the two guards or rests in close proximity to each other, and in conjunction with the shiftable guards or rests the direct pressure of one contact with respect to another of the guard or rest against the nose is thereby appreciably relieved, so that painful pressure of supported glasses on the nose is obviated. At the same time, through the facility with which the contacts on the stems of the guards can be adjusted to peculiar conformations of noses, is provided eyeglasses having guards or rests in use which afford far greater comfort to the wearer.

Having thus described the nature and objects of my invention, what I claim as new, and desire to secure by Letters Patent, is—

1. Eyeglasses having nose-guards, consisting of threaded stems and substantially spherical bodies mounted on said stems and arranged so as to be turned thereon to shift the positions thereof with respect to each other.

2. Eyeglasses provided with nose-guards having stems clamped to the lens-frames thereof and a series of buttons or beads mounted on and arranged so as to be shiftable in two directions on said stems.

3. Eyeglasses provided with lens-frames coupled to each other by means of a spring or bridge-piece and nose-guards, consisting of threaded stems and a series of beads or buttons mounted thereon.

4. Eyeglasses comprising lens-frames coupled to each other by means of a spring or bridge-piece, and nose-guards consisting of threaded stems having a series of beads or buttons adjustably mounted thereon.

In witness whereof I have hereunto affixed my signature in the presence of two subscribing witnesses.

JAMES C. MOORE.

Witnesses:
THOMAS M. SMITH,
B. P. STANLEY.